Aug. 19, 1952     W. E. URSCHEL     2,607,100
MACHINE FOR BUILDING WALLS OF HARDENABLE PLASTIC MATERIAL
Filed June 16, 1948     7 Sheets-Sheet 1

INVENTOR.
William E. Urschel
BY
Atty.

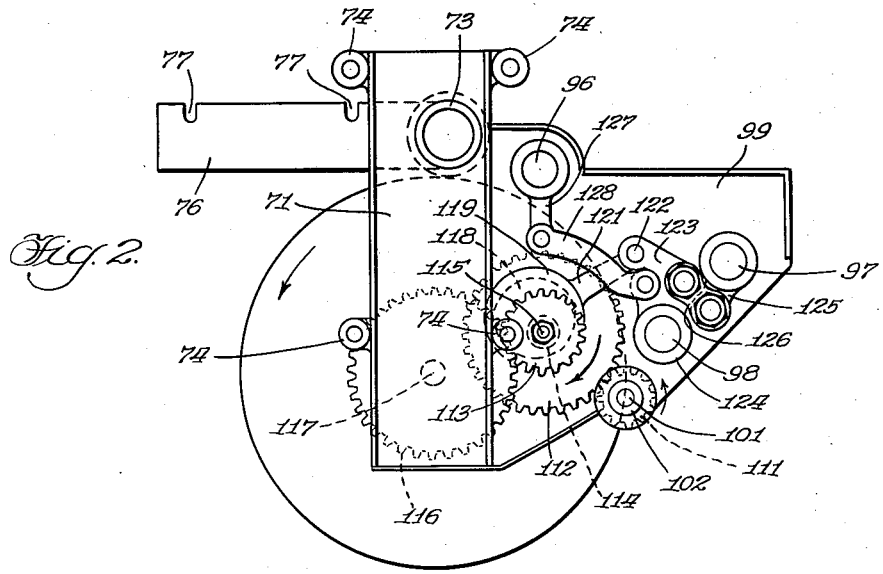
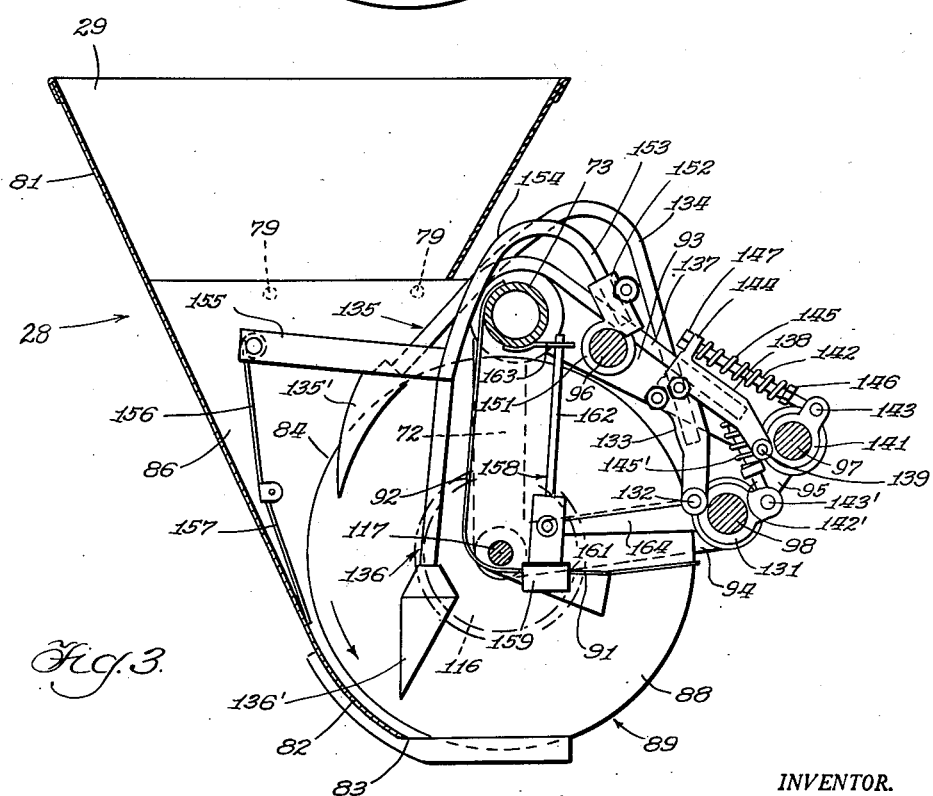

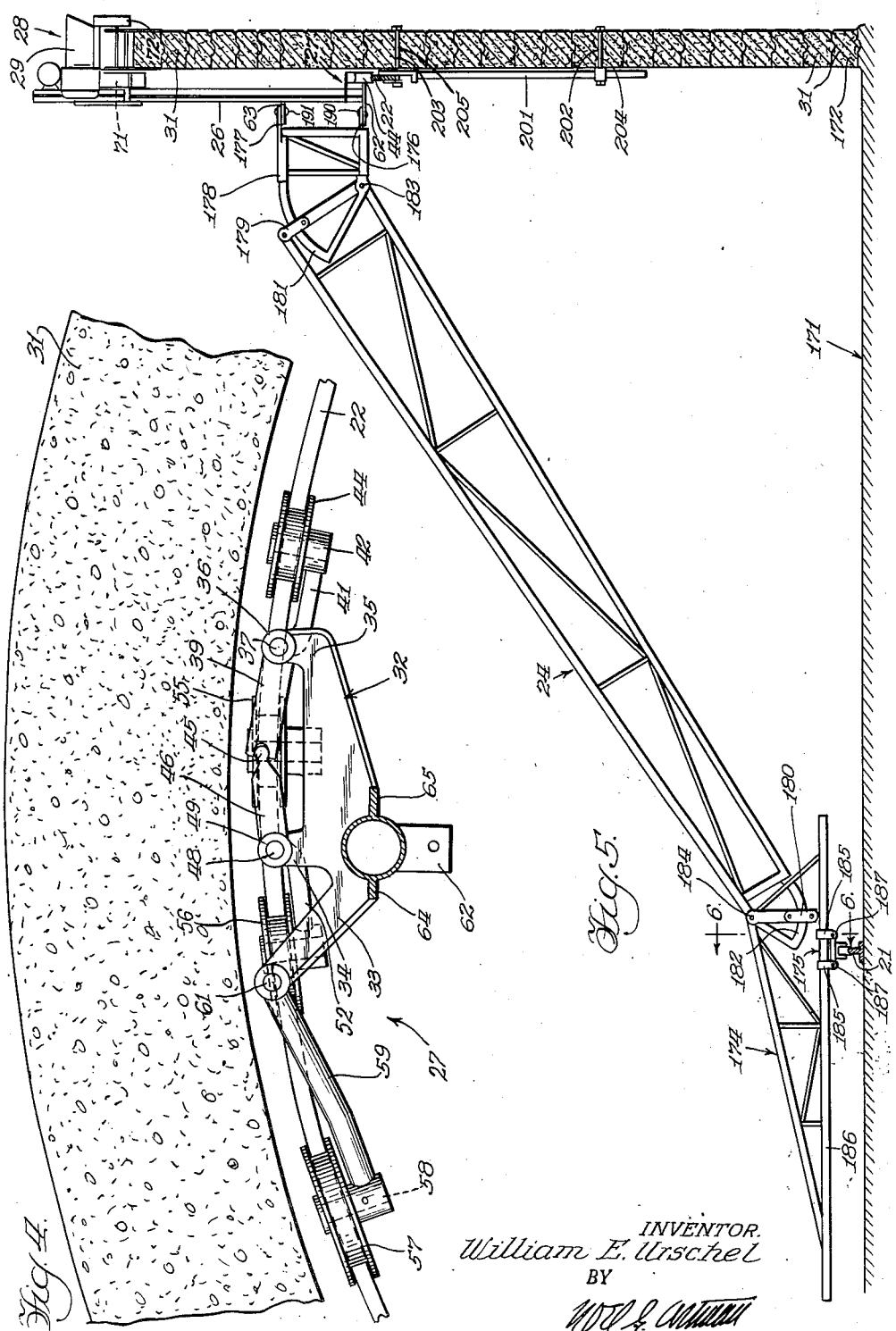

Aug. 19, 1952  W. E. URSCHEL  2,607,100
MACHINE FOR BUILDING WALLS OF HARDENABLE PLASTIC MATERIAL
Filed June 16, 1948  7 Sheets-Sheet 4

INVENTOR.
William E. Urschel
BY
Atty.

Aug. 19, 1952   W. E. URSCHEL   2,607,100
MACHINE FOR BUILDING WALLS OF HARDENABLE PLASTIC MATERIAL
Filed June 16, 1948   7 Sheets-Sheet 5

INVENTOR.
William E. Urschel
BY
Atty.

Aug. 19, 1952     W. E. URSCHEL     2,607,100
MACHINE FOR BUILDING WALLS OF HARDENABLE PLASTIC MATERIAL
Filed June 16, 1948     7 Sheets-Sheet 6

INVENTOR.
William E. Urschel
BY
Atty.

Aug. 19, 1952 W. E. URSCHEL 2,607,100
MACHINE FOR BUILDING WALLS OF HARDENABLE PLASTIC MATERIAL
Filed June 16, 1948 7 Sheets-Sheet 7
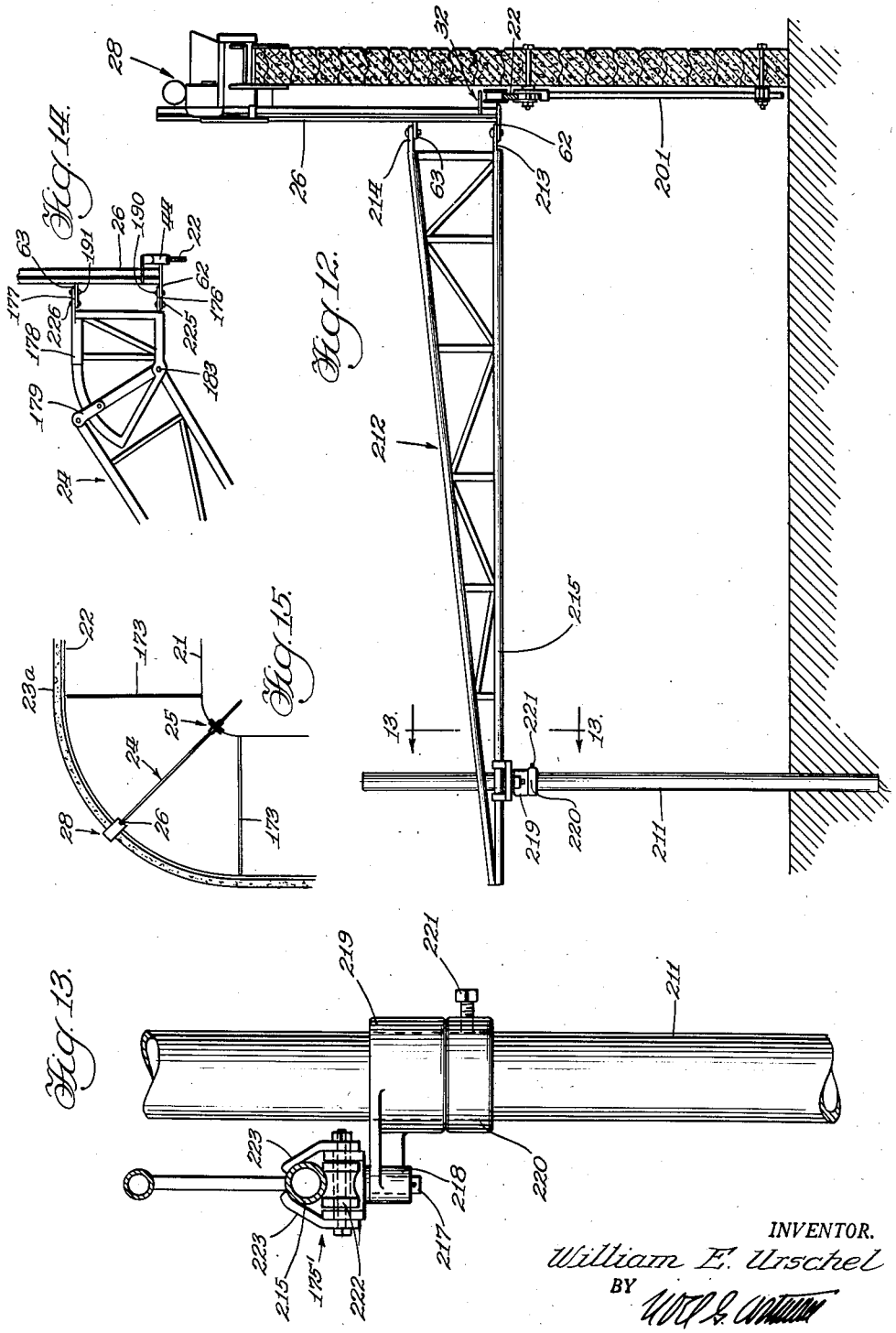
INVENTOR.
William E. Urschel
BY
Atty.

Patented Aug. 19, 1952

2,607,100

UNITED STATES PATENT OFFICE 2,607,100

MACHINE FOR BUILDING WALLS OF HARDENABLE PLASTIC MATERIAL

William E. Urschel, Valparaiso, Ind.; Joe R. Urschel administrator of said William E. Urschel, deceased Application June 16, 1948, Serial No. 33,396

10 Claims. (Cl. 25—131)

This invention has to do with apparatus for building tiered walls of solidifiable plastic material and relates more particularly to apparatus for building upright walls of Portland cement bounding a floor area of various perimetric patterns. This invention is an improvement upon the apparatus disclosed in United States Patents Numbers 2,339,892 and 2,339,893 to the present applicant.

An important object of this invention is the provision of an improved material discharge and molding head which is operable to deposit and tamp Portland cement concrete in a plastic condition in successively superposed courses or tiers pursuant to the molding head being moved lengthwise of a precedingly laid tier. The invention contemplates an improved mounting and operating mechanism for the molding head; and also contemplates a new feeding element for preventing adherence of the plastic concrete to the discharge throat of a hopper which is part of a portable unit including such molding head.

A further object is the provision of a novel supporting and guiding means for the molding head in the form of a carriage upon which the head is transportable and periodically vertically adjustable into proper position for laying successively superposed wall courses.

The carriage of the preceding object is advanceable along a track; and another object of this invention is the provision of a novel track support for supporting said track at different desired elevations upon previously laid wall courses.

Another object is the provision of a new track-supported strut cooperable with an inner track and a wall-supported track attached to a previously laid portion of the wall, the strut being adapted for retaining the molding-head carriage in an upright position while the strut and carriage are advanced along said tracks, and the strut being adjustable to maintain the carriage in the upright position when the tracks are at different relative elevations.

Another object is the provision of a molding-head carriage including an upright standard upon which the carriage is vertically adjustable, and a novel wheeled running gear for supporting the carriage upon a track, and the running gear being articulated to facilitate it following a non-linear track.

The above and other desirable objects inherent in and encompassed by the invention will later appear and will be better understood upon reference to the ensuing description, the appended claims, and the annexed drawings, wherein:

Fig. 2 is a side elevational view of the molding head with the hopper and other parts removed to expose some of the moving parts more effectively.

Fig. 3 is a vertical sectional view taken in the same direction as Fig. 2, but also showing the hopper.

Fig. 4 is a horizontal sectional view taken on the line 4—4 of Fig. 1, showing the articulated running gear of the carriage in plan, and the disposition of this running gear and of the track along which it is advanceable in association with a section of a circular wall being constructed by the apparatus.

Fig. 5 is a side elevational view of a strut together with an adjustable track-carried footing therefor, and supported upon a partially constructed wall by an adjustable carriage-attaching bracket at its upper end.

Fig. 12 is a vertical side elevational view of a modified strut and pivotal support therefor together with a vertical section of a circular wall constructed by a molding head also shown in the figure and braced in operating relation with respect to the wall by means of said strut.

Fig. 13 is an enlarged fragmentary elevational view of the pivotal post shown in Fig. 12 and taken sectionally through the strut on the plane indicated by the line 13—13 in Fig. 12.

Fig. 14 is a fragmentary view showing the frame portion at the upper end of the strut having a rigid connection with the upright molding head carriage standard.

Fig. 15 is a fragmentary plan view showing a concentrically curved corner arrangement of inner and outer tracks and of a wall when the rigid connection of Fig. 14 is used.

Figure 10:
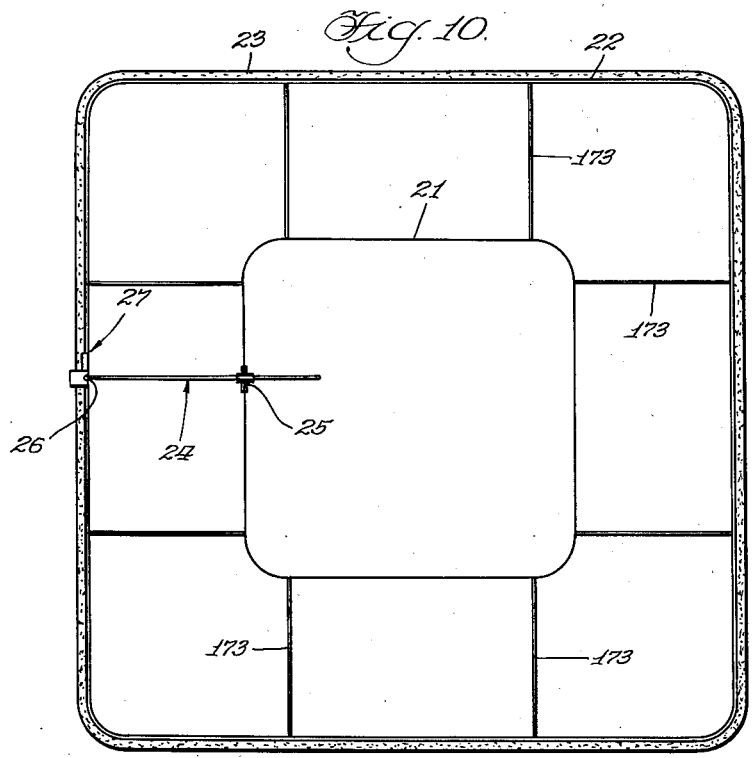
Figs. 10 and 11 are diagrammatic plan views illustrating respectively different track layouts for guiding the apparatus in laying walls of different plan contours.
Figure 11:
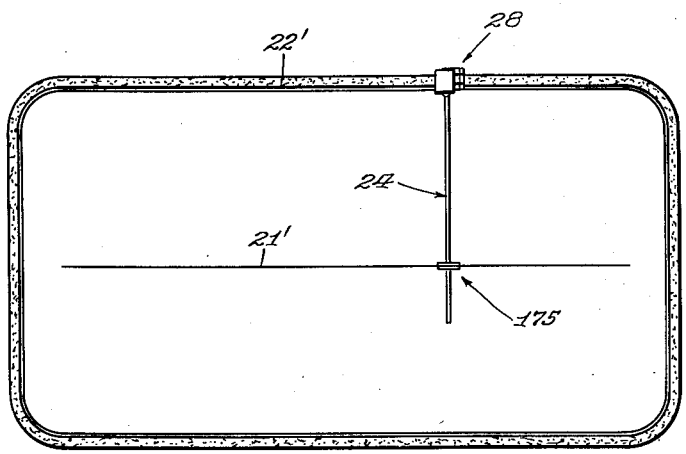

The apparatus illustrated in Figs. 1 to 12 is adapted for use in building Portland cement concrete walls bounding ground areas of various shapes, there being two different rectangular shapes, illustrated in Figs. 10 and 11. The building of a rectangular wall as illustrated in Fig. 10 involves the use of a track 21 centered within the area to be surrounded by the wall and having its respective four sides arranged in parallelism with the four sides of the area to be bounded by the wall and spaced inwardly therefrom. An outer track 22 is laid adjacently to the edge of the rectangular area which is to be enclosed by the wall, such wall being designated 23. A strut 24 is supported at an inner end portion upon a wheeled carriage unit 25 whereas an outer end portion of the strut is attached to an upright standard 26 which is part of a wheeled carriage unit having a running gear 27 advanceable upon the outer track 22. A molding head 28 is supported upon the standard 26, and as the strut and standard 26 are advanced along the inner and outer tracks 21 and 22, concrete in a plastic condition is caused to be discharged from a hopper 29 of the molding head for forming a course of the wall. In Fig. 5 various superposed courses of the partially completed wall are shown in section and respectively designated 31.

*Molding head supporting carriage*

Figure 1:
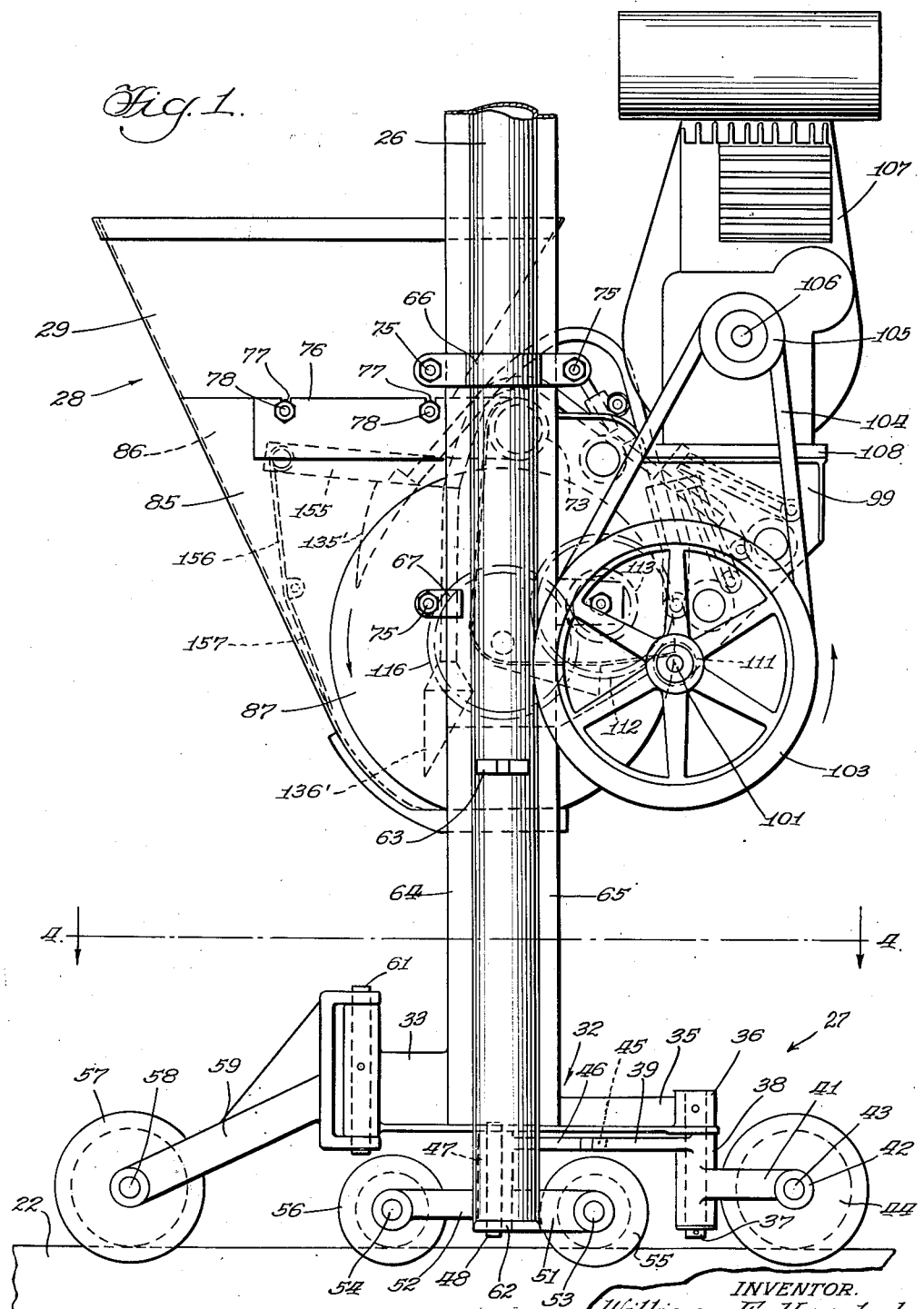
Fig. 1 is a side elevational view of a molding head and an articulated wheeled carriage including a standard upon which the molding head is vertically adjustable, all constructed in accordance with the principles of this invention.

The carriage for supporting the molding head 28 for movement along the outer track 22 is illustrated in Figs. 1, 4, and 5. This carriage comprises the upright tubular standard 26 having a multi-armed bracket 32 at its lower end. This bracket 32 has horizontally projecting arms 33, 34, and 35. Arm 35 has a socket 36 at its extremity in which there is anchored a vertical pivot pin 37 upon which a hub 38 of a lever 39—41 is pivoted, there being oppositely projecting arms 39 and 41 of such lever. The arm 41 has a socket 42 in its extremity for a horizontal journal pin 43 on which a flanged track roller 44 is rotatively mounted. The extremity of the arm 39 is bifurcated as illustrated in Fig. 4 and these furcations straddle a rounded extremity 45 of an arm 46 projecting horizontally from a hub 47, Fig. 1, turning upon a vertical pivot pin 48 anchored in and projecting downwardly from a socket 49 in the extremity of the bracket arm 34. Roller-carrying arms 51 and 52 project oppositely from a lower end portion of the pivoted hub 47 and respectively carry axles 53 and 54 upon which flanged track rollers 55 and 56 are respectively journalled. The oppositely extending arms 51 and 52 together with the flanged rollers 55 and 56 constitute an element of the wheeled running gear supporting the standard 26 and are articulately connected with the roller element 44 of such carriage by the joint formed by the rounded extremity 45 of the arm 46 and the furcations at the extremity of the arm 39. Thus there is provided an interlock between the carriage roller 44 and the rollers 55 and 56 which enables these rollers to mutually contribute to their staying upon the track 22 while traversing a sharp bend therein coincident with corners of the wall. A further flanged roller of the carriage for the molding head is designated 57. This roller is journalled upon an axle 58 carried by the free end of an arm 59 which is pivotally attached to the bracket arm 33 by a vertical pivot pin 61. The pivotal connection of the arm 59 with the bracket arm 33 also facilitates the carriage traversing a sharp turn of the track.

An apertured ear 62 at the lower end of the standard 26, and a second apertured ear 63 projecting from an intermediate section of the standard provide means for attachment of the strut 24, Fig. 5, to the standard. Diametrically opposite radially projecting flanges 64 and 65 of the standard 26 cooperate with a clamping band 66 and a clamping piece 67, Figs. 1 and 4, for attaching the molding head 28 at selected elevations upon the standard while maintaining the molding head fixed circumferentially of the standard.

*The molding head and driving means therefor*

The molding head 28 is constructed about a frame which comprises oppositely disposed uprights 71 and 72, Figs. 2, 3, and 5. These uprights are rigidly interconnected by a tubular cross-member 73. The upright 71 has a cylindrically concave outer face for conforming to the outer periphery of the standard 26. This adapts the upright 71 to cooperate with the clamping strip 66, Fig. 1, and with the clamping piece 67 for maintaining the molding head at the desired selected elevation upon the tubular standard 26. Apertured ears 74, Fig. 2, receive the shanks of bolts 75, Fig. 1, which cooperate with nuts screwed thereon for drawing the clamping strap 66 and the clamping piece 67 respectively into engagement with the tubular body of the standard 26 and with the flange 64 extending lengthwise of such standard.

A pair of supporting arms 76, of which one is shown in Figs. 1 and 2 extend in the same direction from opposite end portions of the tubular cross-member 73, these arms 76 accommodating the hopper therebetween and having notches 77 in their upper edge for receiving stud bolts 78 and 79, Figs. 1 and 3, which are anchored and project outwardly from the opposite walls of the hopper.

One wall, 81, which may be considered the leading or front wall of the hopper, extends diagonally downwardly and has a curved portion 82 adjacent to its lower and rearward extremity 83. Circular cut-out sections 84 in the opposite outer and inner walls 85 and 86 of the hopper conform to the circular periphery of rotatable disk trowels 87 and 88. These trowels are in the same plane as their associated walls 85 and 86 and form constituents thereof. Portions of the rotatable disk trowels 87 and 88 bound opposite vertical sides of a discharge passage 89 of which the upper wall extending between the trowels is designated 91 in Fig. 3. This wall 91 curves forwardly and upwardly into merged relation with a vertical rear wall 92 of the hopper 29. The upper end of wall 92 is curved about and depends from the tubular cross-member 73.

Upright frame member 72 is part of a trapezoidal frame having side member 93 projecting rearwardly or to the right as viewed in Fig. 3 from the upper end of the frame member 72, a frame member 94 extending rearwardly from the lower end of the upright 72, and a frame member 95 interconnecting the rear extremities of the frame members 93 and 94. The frame 72—93—94—95 supports one end of each of three oscillatable cross-shafts 96, 97, and 98. The opposite ends of these cross bars are shown in Fig. 2 where they are shown supported in a plate-like bracket 99, which projects rearwardly, to the right as viewed in Fig. 2, from the upright 71.

A drive shaft 101 for the molding head is suitably journalled in a bearing 102 carried by the plate-like bracket 99. The outer end of this shaft is constrained for rotation with a belt pulley 103 mounted thereon and driven by a belt 104 which in turn is driven by a pulley 105 constrained for rotation with the crank 106 of a small internal combustion engine 107. A base 108 of the engine is mounted upon a flanged upper edge of the bracket 99. The shaft 101 is caused to rotate counter-clockwise as viewed from its outer end in Figs. 1 and 2. Similar rotation is imparted to a spur gear 111 which is constrained for rotation with the shaft 101 and meshes with a companion gear 112 for driving this gear clockwise. Gear 112, and a smaller gear 113 are constrained for rotation with a tubular shaft 114 which is journalled on a stud 115 which is anchored to the bracket plate 99. Gear 113 meshes with and drives a companion gear 116 which is mounted on and imparts rotative movement to a cross shaft 117 having the disk trowels 87 and 88 mounted rigidly upon opposite of its end portions. Opposite end portions of the shaft 117 are journalled in bearings respectively on the uprights 71 and 72. Thus the trowels 87 and 88 are caused to rotate counter-clockwise as indicated by the arrows thereon in Figs. 1, 2, and 3.

The sleeve 114 journalled on the stud 115 rigidly carries a circular eccentric 118 upon which there is mounted the bearing 119 of a crank 121. The free end of the crank 121 is connected by a pivot pin 122 with an arm 123 of which a hub 124 is fixedly mounted upon the cross shaft 98 for oscillating such cross shaft. Rotation of the journalled sleeve 114 and the eccentric 118 thereon imparts oscillative motion to the arm 123 through the crank arm 121. This oscillative motion is transmitted from the arm 123 to an arm 125, rigidly mounted on the cross shaft 97, by a link 126 which is pivotally connected to each of the arms 123 and 125. Oscillative motion is transmitted to an arm 127 from the arm 123 by a link 128 pivotally connected between these arms. The arms 125 and 127 respectively oscillate the cross shafts 98 and 96 upon which they are respectively fixedly mounted.

Referring now to Fig. 3, the oscillated shaft 98 has a collar 131 constrained for oscillation therewith. This collar carries a pivot pin 132 upon which there is journalled a socket 133 into which the shank 134 of a tamping member 135 is inserted and rigidly held. This tamping member has a head 135' which is caused to move upwardly and downwardly in the lower part of the hopper 29. Tamping member 135 is disposed between two tamping members 136 of which only one is shown in the drawings because of these two tamping members 136 being operated in the same phase relation with respect to the tamping member 135. Each of the two tamping members 136 has its shank 137 held firmly in a socket member 138 which is pivotally connected at 139 with a collar 141 fixed to the oscillated shaft 97. Oscillative motion is imparted from each collar 141 to its associated socket 138 and hence to its associated tamping member 136 through a short rod 142 pivoted at 143 to its associated collar 141 and slideable within a bearing 144 at the upper end of the associated socket 138. An expansion helical spring 145 is disposed about each of the rods 142 for reacting against a stop-nut 146 on such rod and the opposed face of the bearing 144 through which the rod passes. Pursuant to counter-clockwise oscillative motion of each collar 141, an impositive pivotal thrust will be imparted to the associated tamping member 136 through the associated spring 145, and pursuant to the ensuing clockwise oscillative motion of each collar 141 a nut 147 on the free end of the associated rod 142 will abut against the bearing 144 and cause retractive motion of such tamping members.

A rod 142' pivoted to the collar 131 at 143' and a spring 145' cooperate with parts concealed by the socket 138 for transmitting oscillative motion from the collar 131 to the tamping member 135 in the same manner that the corresponding parts 142, 143, and 145 transmit oscillative motion from the collars 141 to their respective tamping members 136. The driving connections of the oscillated cross shafts 97 and 98 are such that the two tamping members 136 are operated 180 degrees out of phase with the single tamping member 135 wherefore the heads 136' are moved upwardly in the hopper while the tamping member head 135' is moving downwardly and vice versa.

Oscillated cross shaft 96 carries a pair of axially spaced collars 151 for oscillation therewith, and these collars have respective sockets 152 which receive shanks 153 of bent rods 154 which are elements of a scraping means for the front wall 81 of the hopper 29. The collars 151 and the bend rods 154 operate in identical phase relation so that the one visible in Fig. 3 conceals the other, and these collars and rods are respectively on the outer sides of the tamping members 136. Extensions 155 extending forwardly respectively from the bent rods 154 pivotally carry links 156 which are at opposite ends of and pivotally support a scraper plate 157 at its upper edge. The extension 155 and the link 156 shown in Fig. 3 conceal identical extensions and links which depend from the concealed of the two bent rods 154. The lower edge of the scraper plate 157 slides along the inner surface of the inclined front wall of the hopper during both upward and downward motion thereof pursuant to oscillative motion of the bent rods 154. As the plate 157 slides downwardly it is operable for scraping the front wall 81 and preventing accretion of the Portland cement concrete thereon as it is fed downwardly through the hopper.

As the cement is fed downwardly through the hopper and rearwardly through the discharge passage 89, the upper portion of the plastic tier being thus molded between the trowels 87 and 88 and beneath the upper horizontal wall 91 is tamped by a vertically reciprocable tamping member 158 having tamping head 159 extending inwardly of the molding passage through an opening 161 in the upper wall 91 and having a guide stem 162 piloted in an apertured plate 163 projecting rearwardly from the transverse frame tube 73. Vertical oscillative motion is imparted to the tamping member 158 by an arm 164 which is constrained for oscillation with the shaft 98.

*Wall track and support therefor*

The track 22 for supporting the molding head carriage unit 26—27 is formed from a bendable metal strip which can be shaped to any desired contour corresponding to the plan of the area about which the wall is to be laid. Pursuant to the laying of the first or lowermost wall course 31, Fig. 5, the track 22 will be supported upon the ground or upon a previously formed flooring or foundation 171. Assuming that the wall is to be that of a substantially square or rectangular building as that illustrated in Fig. 10, the track 22 will be bent to the formation illustrated in Fig. 10 and held upon the foundation 171 by means of small spacers (not shown) disposed between the track and a flange-like border 172 projecting upwardly from a peripheral portion of the foundation. The track 21 will be shaped into a pattern congruent to that of the pattern into which the track 22 is shaped but spaced radially inwardly therefrom. Rigid members 173 may be laid upon the foundation 171 between the two tracks 21 and 22 for retaining them in proper spaced relation.

Figure 6:
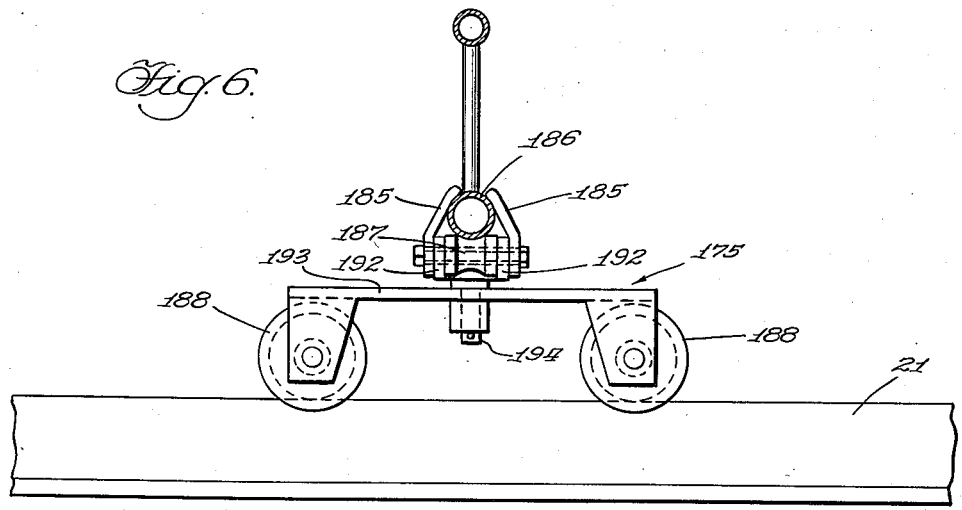
Fig. 6 is a transverse sectional view taken on the line 6—6 of Fig. 5, showing details of the adjustable footing for the strut and of a wheeled carriage which supports this footing upon a track.
Figure 7:
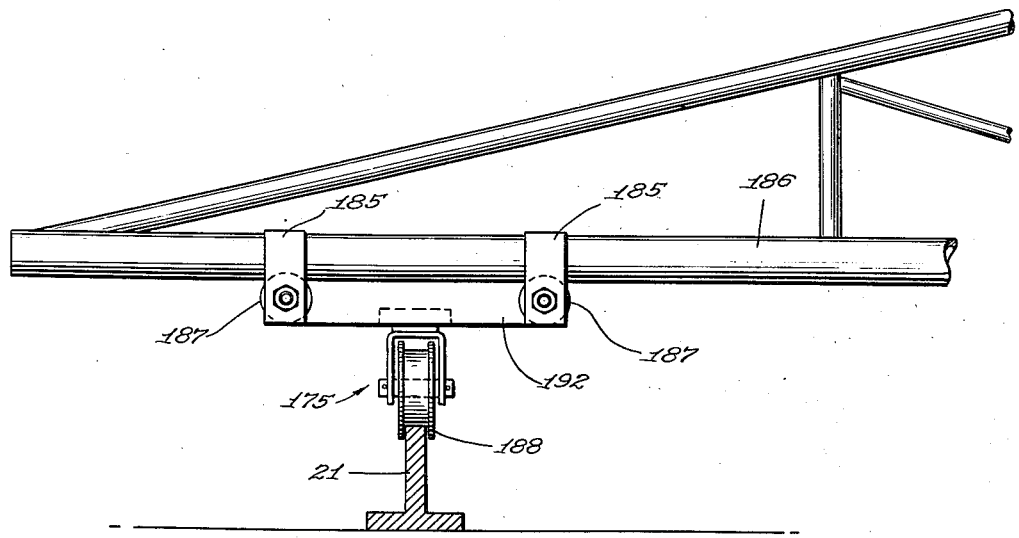
Fig. 7 is an enlarged side elevational view of a portion of the strut footing, showing details thereof.
Figure 8:
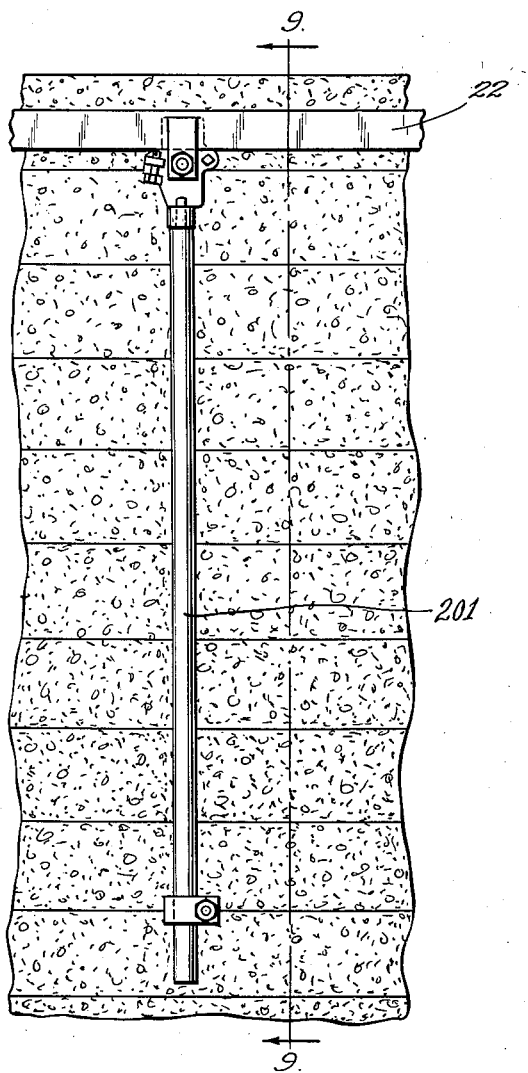
Fig. 8 is a fragmentary view in elevation of the inner side of a wall constructed by the apparatus, and illustrating a track supporting rod and a track supported thereby upon the wall.
Figure 9:
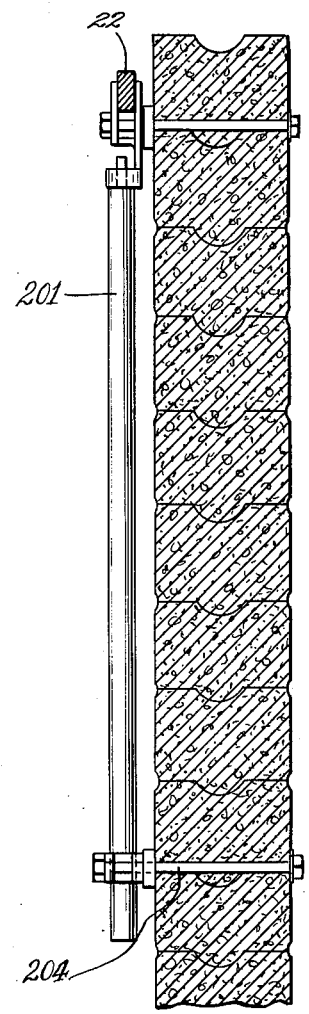
Fig. 9 is a vertical sectional view taken on the line 9—9 of Fig. 8.

The footing portion 174 of the strut 24 is then mounted upon the track 21 by means of its wheeled carriage 175, Figs. 5, 6, and 7, and the standard 26 is mounted upon the track 22 by means of its running gear 27, where the standard 26 is held in an upright position by being attached to vertically spaced members 176 and 177 of a pivotally adjustable frame 178 upon the outer end of the strut 24. While the track 22 is resting upon the foundation 171 adjacently to the perimetric rim 172, the strut 24 will be disposed horizontally in contrast to the upwardly inclined position shown in Fig. 5. To enable the strut to occupy the horizontal position, clamping members 179 and 180 associated with quadrant straps 181 and 182 respectively upon the pivoted frame 178 and upon the inner end of the strut 24 will be loosened to facilitate pivoting of the frame 178 about a pivot pin 183 and pivoting of the footing portion 174 of the strut about a pivot pin 184 at the end of the strut remote from the track 22. Pairs of guide arms 185, Figs. 5, 6, and 7, for a horizontal tubular rail 186 of the footing structure 174 do not restrain lengthwise adjustment of this rail upon a pair of circumferentially grooved rollers 187 of the carriage 175. After the parts have been adjusted in this manner, the clamping straps 179 and 180 will be tightened to hold the strut, its footing structure 174 and its pivotally associated frame 178 rigid.

Rollers 188 of the track carriage 175 are circumferentially grooved for causing these rollers to remain on the track 21 as illustrated in Fig. 7. The vertically spaced members 176 and 177 are attached to the vertically spaced apertured ears 62 and 63 of the molding head supporting standard 26.

*Operation of the apparatus shown in Figs. 1 to 11*

While both of the tracks 21 and 22 are resting on the foundation 171 and the strut 24 is supporting the standard 26 in an upright position, the molding head 28 will be attached to a low position upon the standard 26 by means of the clamping band 66 and the clamping finger 67. Portland cement concrete in a moist plastic condition will be poured in the hopper 29 preparatory to laying the first wall course 31 upon the perimetric rim 172, Fig. 5. The apparatus is set in operation by starting the small internal combustion engine 107 and thereby causing the tamping heads 135' and 136' to reciprocate vertically within the hopper and to thereby claw the plastic material downwardly through the hopper while tamping the material and discharging it rearwardly through the discharge passage 89. The material being tamped and displaced rearwardly in the passage 89 reacts against previously deposited material and thereby causes the molding head to advance lengthwise of the perimetric footing rim 172 at a speed correlated with the speed at which the engine is caused to run. As the molding head is thus advanced lengthwise of the perimetric footing 172 pursuant to laying the first wall course 31, an attendant will manually advance the strut footing portion 174 along the inner track 21 for maintaining the strut perpendicularly between the inner and outer tracks.

Referring to Fig. 10 it will be seen that the perpendicular distance between the tracks at their rounded corners is greater than the perpendicular distance between the straight opposed sections of the tracks. Therefore as the carriage 26—27 approaches one of the corners on the track 22, it will pull the strut footing rail 186 lengthwise and cause the same to move within the retaining arms 185 while rolling upon the peripherally grooved rollers 187. At this time the tubular footing rail 186 will be moved radially outwardly toward the outer track. Maximum endwise outward displacement of the tubular footing rail 186 occurs when each of the wheeled running gears 27 and 175 is at the center of the rounded track corner being traversed. As the molding head continues about the rounded corner of the wall, a thrust force will be imparted from the outer track through the strut 24 to its footing portion 174 causing endwise displacement of the tubular rail 186 in the opposite direction, that is, radially inwardly from the wall. Also it will be noted that pursuant to manipulation of the strut 24 with the wheeled running gears 27 and 175 about the rounded track corners, the strut will not remain perpendicular to either of the tracks at all times. Change in horizontal angularity of the struts with respect to the running gears 27 and 175 and the sections of the tracks being traversed thereby is facilitated by pivotal connections 190 and 191 between the spaced members 176 and 177 of the pivotally adjustable boom frame 178 and the apertured ears 62 and 63 of the molding head carrying standard 6, and by pivotal connection of bars 192 of the running gear 175 with the wheel-supported platform 193 thereof through a pivoted king pin 194; see Fig. 6.

As the molding head 28 advances, the scraping means comprising the vertically reciprocable members 155, Fig. 3, and the articulately connected scraper member 157 cause the lower edge of the latter to move along the inner surface of the downwardly and rearwardly declining front wall 81 to prevent accumulation and solidification of the cement thereon. The tamping head 159 moving up and down against the upper portion of the plastic material being discharged rearwardly through the molding passage 89, thereby improving the consistency of the wall course being laid and causing the elimination of voids in the wall course and augment the effect of the tamping members 135 and 136 in tamping the wall course to assure it being compact.

The rotating trowels 87 and 88 on opposite sides of the wall course being laid work moisture to the surface of such wall course, thereby strengthening the interior of the wall course and causing its vertical sides to be smooth.

Each time that a wall course is completed, the clamping bar 66 and the clamping finger 67 will be released and the molding head raised upon the standard 26 the proper distance for laying a succeeding wall course upon the course which has just been laid. After the laying of enough courses that the molding head is raised to the top of the standard 26, the outer track 22 will be raised and supported upon a plurality of vertical rods 201.

These rods will be spaced lengthwise or circumferentially of the wall being laid. In anticipation of the rods 201 later being fastened to the wall, holes 202 will have been formed in the wall before solidification of the cement for subsequent reception first of bolts 203 and later of bolts 204. Subsequent to the track 22 having been mounted upon the upright rods 201 secured to the inner face of the wall, the boom will be readjusted into an angular position for supporting the standard 26 upright. Subsequent to this adjustment the clamps 179 and 180 for the quadrant straps 181 and 182 will be retightened. The molding head 28 will again be moved to the lower end of the standard 26 and a new series of wall courses laid until the molding head has been stepped to the top of the standard, whereupon the track will be again raised, this time to the position illustrated in Fig. 5 where bolts 204 attachable to the lower ends of the rods 201 will be placed in the holes 202, and the bolts 203 will be placed in newly formed holes 205. When the molding head carrying standard 26 is again raised and mounted upon the raised track, the boom 24 will be fastened rigidly in its new angular position by tightening the clamps 179 and 180 upon their associated quadrant straps 181 and 182 as before. The new series of wall tiers will then be commenced with the molding head again clamped to a lower portion of the upright standard 26. This process is repeated until the wall attains the desired height.

A wall in rectangular plan can be laid by using a rectangular outer track 22' corresponding to the track 22 and a single inner track 21' corresponding to the track 21. The wall courses are laid in superposed relation as before, as the molding head 28 is caused to move lengthwise of the wall. The king pin connection 194, Fig. 6, of the footing supporting bars 192—192 permit the strut 24 to be pivoted about a vertical axis intersecting the running gear 175 which runs on the track 21' whereby the boom can be manipulated to facilitate the carriage unit 25 following the outer track 22' about the corners and across the shorter end walls of the rectangular wall plan illustrated in Fig. 11. Also the articulated character of the running gear 27 for the upright standard 26 enables this carriage to retain all of its wheels on the track 22 while traversing a corner bend of relatively short radius.

*Strut and support therefore shown in Figs. 12 and 13*

The boom and support therefor shown in Figs. 12 and 13 eliminates the necessity for a center track as that illustrated at 21 and 21' in the first embodiment. Instead of using an inner track, it is possible to use an upright in the form of a floor-anchored pivot post 211 having a temporary anchorage in the floor surrounded by the wall being laid. A rigid strut 212 is employed with the upright 211, this strut having vertically spaced portions 213 and 214 respectively corresponding to the vertically spaced portions 176 and 177 shown in Fig. 5 of the first embodiment, for pivotal connection with the apertured ears 62 and 63 of the molding head supporting standard 26. A tubular rail 215 forms the lower side of the strut 212 and this rail is adjustable lengthwise within a carriage 175' which corresponds to the carriage 175 of the first embodiment. This carriage 175 constitutes supporting means for circumferentially grooved rollers 222 and has a king pin 217 pivotally supported in a bearing 218 of a bracket 219 vertically adjustable upon the upright 211 and retained at the desired elevation by a collar 220 and a setscrew 221. Bracket 219 is rotatable upon the upright 211. Endwise movement of the strut 212 is facilitated by the circumferentially grooved rollers 222 of the carriage 175' and upon which the tubular lower rail 215 of the strut is endwise moveable incident to causing rotation of such rollers. Guide arms 223 of the carriage 175' merely retain the tubular rod 215 upon the rollers without restraining endwise movement of such rod. Since the bracket 219 is rotatable upon the upright 211 and since the strut is movable endwise within the carriage 175', the track 22 for the articulated running gear 27 for the upright standard 26 can be laid in any horizontal configuration and still be traversed by such running gear while the strut adjusts itself circumferentially of the upright 211 and radially thereof for maintaining the standard 26 upright.

Strut 212 and the upright 211 cooperable therewith are utilizable in conjunction with a wall rod 201 in the same manner in which the strut 24 of the first embodiment was utilizable with such rod for holding the track 22 at different elevations.

In Fig. 14 the strut end portion 178 is shown rigidly attached to the standard 26 by the employment of pins 225 and 226 in the apertured ears 62—176 and 63—177 in addition to the pins 190 and 191. With the strut 24 thus rigidly connected with the standard, the flanged-wheel running gear 27 in reacting against the track 22 maintains the strut perpendicularly between the two tracks. Under these circumstances the automatic advancement of the molding head, as it lays a wall course, also advances the wheeled carriage unit 25 on the inner track 21, and it is essential that the curve in track 21 at the wall corners be concentric with the curve in the outer track 22 as illustrative in Fig. 15.

When the running gear 27 is passing about a curve on the track 22 the rollers 55 and 56 will be in a common tangent to the curve of the track that intersects a tangent common to the plane of the roller 44. Thus the rollers 55 and 56 will be in one plane and the roller 44 will be in another plane, both planes being vertical, intersecting the first plane at an angle. Consequently the two arms 39 and 46 projecting respectively from the bearing sleeves 38 and 47 will be pivoted at their articulate connection 45. These arms 39 and 46 constitute rotation imparting means connected between the sleeves 38 and 47, said arms being counterparts of such connecting means and being meshed at the articulation 45 for constraining the sleeves for concert pivoting in respectively opposite directions. The connection between the paired rollers 55 and 56 and the single roller 44 formed by the arms 39 and 46 and their interlocking connection at 45, in addition to facilitating the carriage 27 to traverse a sharp bend in the track, increases the distance lengthwise of the track between points at which force is imparted transversely to the track reactionary to a horizontal force imparted to the strut 24, Fig. 5. Any twisting force imparted to the standard 26 by a horizontal force on the strut 24 is resisted by reaction of the roller 56 in one lateral direction on the track 22 and force of the roller 44 in the opposite lateral direction on the track because of the connection between these rollers through the meshed end portions of the arms 39 and 46. By thus increasing the distance lengthwise of the track at which the forces applied oppositely thereto resist turning of the standard 26 about its vertical co-axis the magnitude of these forces applied oppositely to the track is correspondingly diminished, making it feasible for the inner end of the strut 24 to be propelled along the inner track 21 by the impelling force imparted to the molding head 28 by the tamping heads 135' and 136' as they press against the cement discharged through the tier forming passage 89 of the molding head.

Having thus described a limited number of embodiments of the invention with the view of clearly and concisely illustrating same.

I claim:

1. Tiered wall building apparatus comprising a molding-head supporting standard advanceable upon a track extending contiguously to and lengthwise of a locus to be occupied by a wall, means for transporting and guiding the standard upon the track, a strut connected with the standard to maintain it upright on the track and projecting from the standard transversely of the track to place a remote end of the strut in laterally spaced relation from the track, a support for the said end of the strut, and means mounting said end of the strut upon said support, and said mounting means accommodating horizontal movement of the strut relatively to said support while maintaining said end of the strut at a predetermined elevation.

2. The combination set forth in claim 1, wherein said mounting means accommodates endwise movement of the strut while maintaining the end thereof at substantially constant elevation.

3. The combination set forth in claim 2, wherein said mounting means also accommodates horizontal swinging motion of the strut relatively to the support.

4. The combination set forth in claim 1, wherein there is means pivotally connecting the strut with said standard to accommodate horizontal swinging of the strut relatively to the standard but operable to prevent tipping of the standard from its upright position relatively to the strut.

5. Tiered wall building apparatus comprising a molding-head supporting standard advanceable upon a track extending lengthwise of and contiguously to a locus to be occupied by a wall, a running gear for supporting and guiding the standard on said track, an elongated strut for stabilizing the standard in an upright position; said strut including an elongated main body and a pivoted frame at one end of such body for connection with the standard, said frame being preselectively adjustable about a horizontal axis relatively to said body and having a pivotal connection with the standard about a vertical axis to accommodate swinging of the strut about such vertical axis relatively to the standard while maintaining the standard upright, said strut also including a footing structure at the opposite end thereof and preselectively settable about a horizontal axis relatively to said main body of the strut; and supporting means for said footing structure, said supporting means accommodating swinging motion of said footing structure relatively thereto about a vertical axis and also accommodating horizontal translatory motion of said footing structure relatively thereto within a vertical plane in parallelism with the strut.

6. The combination set forth in claim 5, wherein the strut footing structure comprises a horizontal rail, and wherein the supporting means for the footing structure includes a roller frame which is pivotable about a vertical axis and roller means upon said frame, and such roller means supports the rail for endwise movement.

7. The combination set forth in claim 6, wherein there is a track-mounted running gear supporting said frame, and a king pin providing a vertical pivotal connection between said frame and said running gear.

8. Tiered wall building apparatus comprising a molding-head supporting standard advanceable upon a track extending lengthwise of and contiguously to a locus to be occupied by a wall; a running gear for supporting and guiding the standard on said track; an elongated strut for stabilizing the standard in an upright position; means at an end of the strut for connecting the same with the standard for pivotal movement relatively thereto about a vertical axis, the strut including a horizontal rail adjacent the opposite end thereof; and strut supporting means for such opposite end of the strut, comprising a floor-anchored pivot post, a roller frame, roller means journalled in said frame and for carrying said rail thereon to accommodate endwise movement thereon of said rail and strut, means pivotal substantially coaxially about said post and for supporting the roller frame for pivotal adjustment about a vertical axis, said roller frame supporting means being adjustable axially of said post, and means for preserving axial adjustment of the roller frame supporting means on said post.

9. Tiered wall building apparatus comprising a molding-head supporting standard, a running gear in support of said standard and advanceable upon a track extending lengthwise of and contiguously to a locus to be occupied by a wall, a strut rigidly connected with said standard and projecting therefrom transversely of the track, carriage means for supporting an extending end portion of the strut and transporting it in parallelism with said track; said running gear comprising bearing pin supporting means on said standard, vertical bearing pins mounted on said supporting means substantially in vertical registration with said track and spaced apart lengthwise of the track, a bearing sleeve pivotally mounted on one of said pins, wheel supporting arms extending lengthwise of such track in opposite directions from said sleeve, flanged wheels journalled respectively upon said arms in position for rolling upon said track, a third arm projecting rigidly from the sleeve toward the other bearing pin, a sleeve journalled on the second bearing pin and having oppositely projecting arms extending in general parallelism with the track, one of said arms projecting toward the third arm on the first sleeve and having an articulated connection therewith for causing concert pivoting of the sleeves in respective opposite directions, a flanged track roller journalled on the other arm of the second named named sleeve for rolling upon the track.

10. Tiered wall building apparatus comprising a molding-head supporting standard, a running gear in support of said standard, and advanceable upon a track extending lengthwise of and contiguously to a locus to be occupied by a wall, a strut rigidly connected with said standard and projecting therefrom transversely of the track, carriage means for supporting an extending end portion of the strut and transporting it in parallelism with said track; said running gear comprising bearing pin supporting means on said standard, vertical bearing pins mounted on said supporting means substantially in vertical registration with said track and spaced apart lengthwise of the track, a bearing sleeve pivotally mounted on one of said pins, wheel supporting arms extending lengthwise of such track in opposite directions from said sleeve, flanged wheels journalled respectively upon said arms in position for rolling upon said track, a sleeve journalled on the second bearing pin, an arm on the second named sleeve and projecting therefrom oppositely from the one bearing pin, a flanged track roller journalled on the last named arm for rolling on the track, and rotation imparting means connecting between said sleeves comprising meshed counterparts projecting respectively from the sleeves for constraining them for concert pivoting in respectively opposite directions.

WILLIAM E. URSCHEL.

REFERENCES CITED

The following references are of record in the file of this patent:

UNITED STATES PATENTS

| Number | Name | Date |
|---|---|---|
| 918,855 | Holman | Apr. 20, 1909 |
| 2,339,892 | Urschel | Jan. 25, 1944 |
| 2,339,893 | Urschel | Jan. 25, 1944 |

FOREIGN PATENTS

| Number | Country | Date |
|---|---|---|
| 172,040 | Great Britain | Dec. 2, 1921 |